Feb. 17, 1970     W. H. LEE ET AL     3,496,440
FREQUENCY-SENSITIVE CONTROL CIRCUIT FOR MOTOR BRAKING RELAY
Filed Oct. 28, 1966
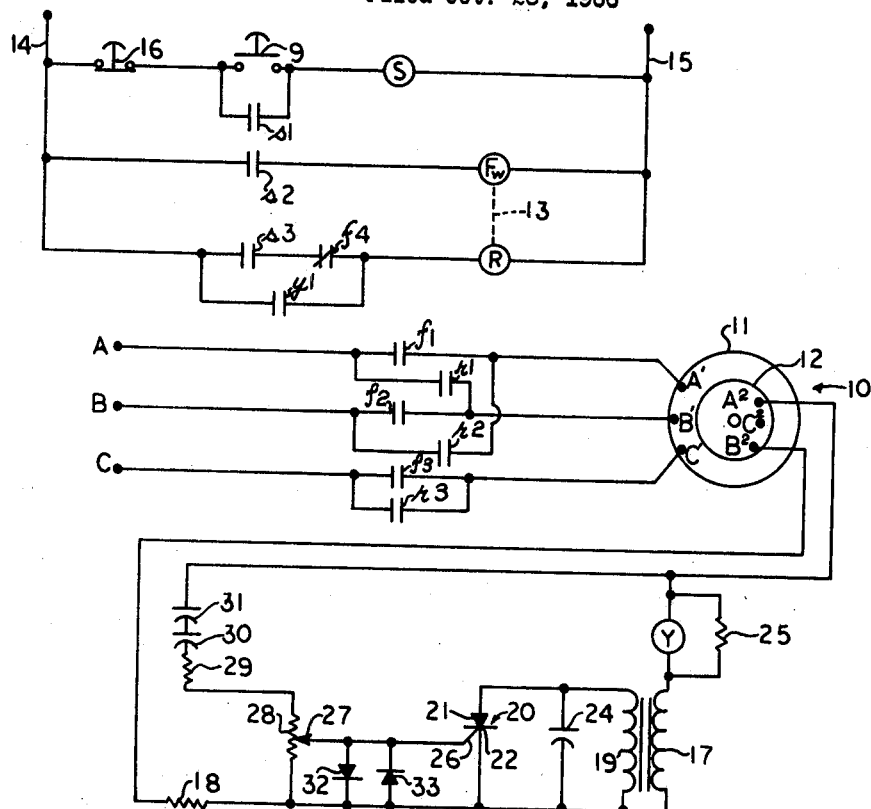
FIG.1
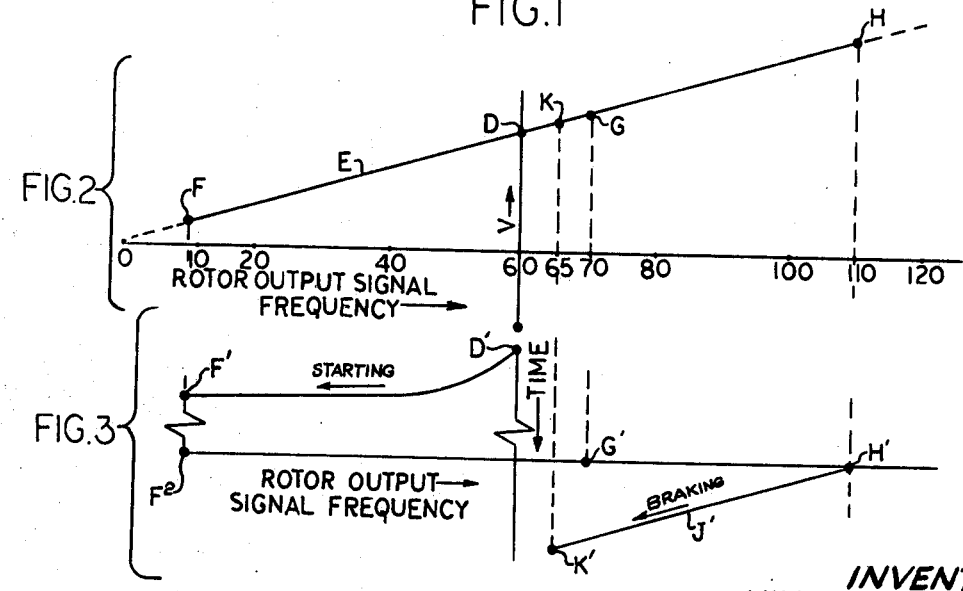
FIG.2
FIG.3
INVENTORS
WILLIAM H. LEE
ROGER H. STOTZER
BY Yount, Raney, Flynn & Tarolli
ATTORNEYS

United States Patent Office 3,496,440
Patented Feb. 17, 1970

3,496,440
FREQUENCY-SENSITIVE CONTROL CIRCUIT FOR MOTOR BRAKING RELAY
William H. Lee, Lakewood, and Roger H. Stotzer, Parma, Ohio, assignors to Harris-Intertype Corporation, a corporation of Ohio
Filed Oct. 28, 1966, Ser. No. 590,257
Int. Cl. H02p 3/20
U.S. Cl. 318—203                                    10 Claims

ABSTRACT OF THE DISCLOSURE

Frequency-sensitive control circuit for a control relay to reverse-energize a wound rotor A.C. motor during braking. This control circuit has an L–C tuned circuit separate from the control relay coil and in series with a potentiometer across one phase of the rotor. When initially reverse-energized through a reverse relay, the motor produces a rotor output signal of increasing frequency which, through the potentiometer, turns on an SCR at a particular pick-up frequency. The SCR is transformer-coupled to the control relay coil to energize the latter for holding in the reverse relay until the rotor output signal drops below a drop-out frequency. An additional resistance in series with both the potentiometer and the control relay coil enables the drop-out frequency to be just slightly below the pick-up frequency to avoid reverse rotation of the rotor.

---

This invention relates to a frequency-sensitive control circuit which is particularly adapted for controlling the duration of reverse energization of the stator of a wound rotor A.C. motor to brake the motor.

Prior to the present invention, various frequency-sensitive control circuits for plural phase A.C. motors have been proposed in which the phase sequence of the power supply for the stator of the motor is reversed to slow down the rotor, after which the energization of the stator is completely discontinued to permit the rotor to coast to a stop.

In one general type of such control circuits, the reverse energization is applied to the stator for a predetermined interval of time after a stop switch is operated by the user. For many practical applications, control circuits of this general type are not desirable because the predetermined time interval during which reverse energization is applied may be too short, if the motor has been operating at high speed, so that the reverse energization of the stator produces insufficient braking of the rotor, or it may be too long, if the motor has been operating at low speed, so that the reverse energization of the stator causes the rotor to reverse its direction of rotation. For example, in a printing press the drive motor may be operated at high speed during normal printing operation of the press or it may be operated at a much lower speed when the operator is cleaning the press or during the "make ready" period. A time interval for reverse energization which would provide adequate braking of the motor at its normal high speed would be excessive if the motor were operating at low speed. In that case, the reverse energization might continue long enough to reverse the rotation of the printing rolls, which would be undesirable for safety and other reasons.

Another type of such control circuits for A.C. motors employs a frequency-sensitive relay arrangement for controlling the duration of the reverse energization of the stator in accordance with the frequency of an output signal from the wound rotor of the motor. When the user operates the stop switch to reverse the energization of the stator, the frequency of this output signal from the rotor will increase abruptly and at some predetermined frequency it will cause this relay to pick up so as to maintain the reverse energization circuit for the stator. Then the rotor output signal frequency will decrease as the rotor's speed of forward rotation (which continues due to inertia) slows down due to the retarding action produced by the reverse energization of the stator. In this type of control circuit, the coil of the relay is part of a tuned L–C circuit which is supposed to cause the relay to drop out and discontinue the reverse energization of the stator when the rotor output signal frequency has decreased to a predetermined value lower than the frequency at which it picked up. The reactive impedance of relays previously used for this purpose commonly may be adjusted by means of adjusting springs acting on the relay's contacts or by means of an adjusting screw for varying its air gap. This enables the user to adjust the drop-out frequency. In many practical applications, particularly on printing presses, the operating characteristics of such relays tend to change with age and use. For example, the spring rate of the adjusting springs or the setting of the air-gap adjusting screw may change because of the physical beating to which the relay is subjected in the normal operation of the press. When the effective inductance of such a relay changes, then this changes the rotor output signal frequencies at which the relay will pick up and drop out, and the control circuit will fail to operate in the manner originally intended.

The present invention is directed to a frequency-sensitive control circuit which avoids these difficulties and disadvantages by having the relay which controls the duration of reverse energization of the stator separate from the tuned circuit which controls the drop-out point of the relay. Consequently, in order to adjust the drop-out point of the relay, it is not necessary to provide adjustable springs or an air-gap adjustment in the relay, and the relay itself may be of simplified and durable construction which enables it to withstand the severe operating conditions to which it is subjected. Instead, the drop-out point of the relay may be selectively set by adjusting a conventional electrical impedance element, such as a potentiometer, connected to the impedance elements which make up a frequency-sensitive tuned circuit, all of these impedance elements being external to the relay, and this drop-out point may be close to the pick up frequency of the relay.

A principal object of this invention is to provide a novel and improved frequency-sensitive control circuit including a control relay and frequency-sensing means which controls the operation of this relay, but whose operation is not dependent on the electrical impedance characteristic of the relay itself.

Another object of this invention to provide a novel and improved control circuit for a wound rotor A.C. motor in which the duration of reverse energization of its stator for braking the motor is controlled in a more reliable manner.

Another object of this invention is to provide such a motor control circuit having a relay for controlling the duration of such reverse energization which is physically separate from a frequency-sensitive circuit which responds to a predetermined frequency of an output signal from the rotor to cause the relay to drop out and thereby discontinue the reverse energization of the motor.

Another object of this invention is to provide such a motor control circuit in which the relay for controlling the reverse energization of the motor picks up in response to an increase in the rotor output signal frequency after a stop switch is operated and drops out at a rotor output signal frequency just slightly lower than the frequency at which it picked up.

Another object of this invention is to provide a frequency-sensitive control circuit including a control relay whose drop-out point can be selectively adjusted without adjusting the relay itself.

Further objects and advantages of the present invention will be apparent from the following detailed description of a presently-preferred embodiment thereof which is shown schematically in the accompanying drawing.

In the drawing:

FIGURE 1 is a simplified circuit diagram showing a frequency-sensitive control circuit for a wound rotor A.C. motor in accordance with the present invention;

FIGURE 2 is a plot of the output signal voltage developed across one phase of the motor rotor versus the frequency of this output signal voltage; and FIGURE 3 is a plot of the freqcency of the rotor output signal against time during operation of the motor from an off condition to a normal run speed and then as the motor is brought to a stop by the present control circuit.

Referring to FIG. 1, the motor 10 whose operation is to be controlled is a conventional A.C. motor having a three-phase stator 11 and a wound rotor 12 with three phase windings thereon. The stator 11 is connected to be energized from a conventional three-phase, 60 cycle per second A.C. source via respective phase input terminals A, B, and C.

The rotational direction of the motor is controlled by a conventional arrangement of "forward" and "reverse" relay contacts. The forward contacts are the normally-open contacts $f1$, $f2$, and $f3$ connected respectively between the input terminals A, B, C and the respective stator terminals $A^1$, $B^1$, and $C^1$ on the motor. When these contacts $f1$, $f2$, and $f3$ are all closed, the phase sequence may be assumed to be A, B, C, A and the rotor 12 of the motor is driven in a forward direction. The reverse contacts are the normally-open contacts $r1$ connected between the input terminal A and the stator terminal $B^1$, the normally-open contacts $r2$ connected between the input terminal B and the stator terminal $A^1$, and the normally-open contacts $r3$ connected across the forward contacts $f3$ between input terminal C and the stator terminal $C^1$. When these reverse contacts $r1$, $r2$ and $r3$ are all closed, the phase rotation is B, A, C, B and the rotor 12 of the motor is driven in the reverse direction.

The forward relay contacts $f1$, $f2$, $f3$ are all under the control of a "forward" relay coil designated $Fw$ in FIG. 1. Similarly, the reverse relay contacts $r1$, $r2$, and $r3$ are all under the control of a "reverse" relay coil designated R in FIG. 1. The two relays $Fw$ and R have a mechanical interlock designated schematically by the dashed line 13 in FIG. 1, such that when the forward relay contacts $f1$, $f2$, and $f3$ are closed, the reverse relay contacts $r1$, $r2$, $r3$ are held open, and vice versa.

The control circuit for the relay coils F and R includes a pair of power supply lines 14 and 15. A "start" relay coil S is connected across these lines through a normally-closed, manually-operated "stop" switch 16 and a normally-open, manually-operated "run" switch 9. With the stop switch 16 closed, when the user closes the run switch 9, this completes an initial energization circuit for the start relay coil S. Such energization of coil S causes the normally-open contacts $s1$ of relay S to close, completing a holding circuit for relay S independent of the run switch 9, so that the user may now release the run switch 9 to enable it to assume its normally-open condition.

The energization of the start relay S also closes its normally-open contacts $s2$ to complete an energization circuit for the forward relay coil $Fw$. Such energization of the forward relay cause its contacts $f1$, $f2$, and $f3$ to close to start the motor in a forward direction.

The reverse relay coil R is connected in series with a set of normally-open contacts $s3$ of the start relay S and a set of normally-closed contacts $f4$ of the forward relay $Fw$. The start relay contacts $s3$ have a predetermined time delay in both opening and closing, so that they do not close (in response to the energization of relay S) until after relay contacts $s2$ have closed, relay $Fw$ has become energized, and its relay contacts $f4$ have opened to prevent relay R from being energized at this time.

The reverse relay coil R is also under the control of a set of normally-open relay contacts $y1$, connected across the relay contacts $s3$ and $f4$, as shown in FIG. 1. These relay contacts $y1$ are under the control of a relay coil Y. Relay Y is connected in series with the primary winding 17 of a transformer and a resistor 18 across the A and B phase output terminals, $A^2$ and $B^2$, on the rotor 12 of the motor. The secondary winding 19 of this transformer is connected across the anode-cathode path of a silicon-controlled rectifier 20 designed to fire on low voltage and low current. The SCR 20 acts as a voltage-sensitive switch for controlling the energization of relay Y through the transformer coupling 17, 19 between them, as explained hereinafter. The upper end of the transformer secondary 19 is connected directly to the anode 21 of this SCR. The lower end of the transformer secondary 19 and the cathode 22 of the SCR are connected directly to the juncture 23 between the lower end of the transformer primary 17 and resistor 18. A suppressor capacitor 24 preferably is connected across the SCR 20 to protect it against excessive voltages. A dampening resistor 25 is connected across relay Y.

The SCR 20 has a control or gate electrode 26 which is connected to the adjustable contact 27 of a potentiometer 28, whose lower end is connected to the aforementioned juncture 23. The upper end of potentiometer 28 is connected to the $A^2$ terminal of the motor rotor through a frequency-sensitive tuned circuit composed of an inductance coil 29 and a pair of capacitors 30, 31, all connected in series. This tuned circuit, in the embodiment under discussion, has a resonant frequency of approximately 120 cycles per second.

A pair of semiconductor diodes 32 and 33 are connected in parallel with each other and with opposite polarities across the control electrode 26 and the cathode 22 of the SCR 20. These diodes limit the voltage applied across the control electrode and the cathode of the SCR in alternate half cycles of the output signal from the rotor 12.

When the SCR 20 is non-conducting, it presents virtually an open-circuit load across the transformer secondary 19. Consequently, substantially all of the output signal voltage across the motor rotor terminals $A^2$ and $B^2$ will appear across the transformer primary 17, and very little of this output signal voltage will appear across relay coil Y. Consequently, under these conditions, the relay Y is substantially de-energized and its contacts $y1$ remain open.

However, when the SCR 20 is turned on, in response to a control signal of a predetermined magnitude on its gating electrode 26, it presents virtually a short-circuit load across the transformer secondary 19. Consequently, very little of the output signal voltage developed across the transformer motor rotor terminals $A^2$ and $B^2$ will appear across the transformer 17. Instead, most of this output voltage will appear across relay coil Y and the remainder will appear across resistor 18, which is in series with the relay coil. Such energization of relay Y will cause its contacts $y1$ to close and thereby complete an energization circuit for the coil of relay R. This will cause the $r1$, $r2$, and $r3$ contacts in the energization circuit for the stator 11 of the motor to stay closed, as explained hereinafter.

The operation of the motor is illustrated by FIGURES 2 and 3, in which the three-phase power supply frequency is assumed to be 60 cycles per second.

If the motor rotor 12 is braked against rotation and the stator 11 is energized, the motor speed will, of course, be zero and the frequency of the output signal across the rotor output terminals $A^2$, $B^2$ will be 60 cycles per second, as indicated by the point D in FIG. 2. If the brake is released the rotor speed will increase along the line E to the rated speed F for the particular mechanical load on the motor. This speed will be less than the synchronous speed. The frequency of the output signal appearing across the rotor terminals $A^2$, $B^2$ will decrease as the rotor speed increases and, at the final rotor speed, this rotor output signal frequency will be 10 cycles per second in the particular example illustrated in FIG. 2.

The tuned circuit 29–31 presents an extremely high impedance at this signal frequency. Consequently, substantially all of the voltage drop between the rotor terminal $A^2$ and the juncture 23 will take place across this tuned circuit, and very little of this voltage drop will appear across the potentiometer 28. The potential at the control electrode 26 of SCR 20 will be insufficient to turn on the SCR during the positive half cycles of the rotor output signal voltage. Consequently, the secondary 19 of the transformer will be substantially open-circuited and the relay coil Y will be insufficiently energized to close its contacts y1.

FIGURE 3 illustrates the performance curve for a typical motor of this type, with the rotor output signal frequency plotted along the horizontal axis against time, plotted along the vertical axis. In FIG. 3, the point $D^1$ indicates when the rotor begins to rotate and point $F^1$ indicates when the rotor has reached its full speed for this particular load. The rotor will maintain this same speed and output frequency throughout the run time.

When the user wants to stop the motor 10, he opens the normally-closed stop switch 16. This action de-energizes the start relay coil S, causing the latter's contacts s2 to open. The opening of the relay contacts s2 de-energizes the forward relay coil Fw to open the relay contacts f1, f2, and f3 in the energization circuit for the stator 11 of the motor and to permit the relay contacts f4 to assume their normally-closed condition.

The relay contacts s3 have a predetermined time delay (such as one second) in opening in response to the de-energization of relay C. Consequently, contacts s3 remain closed while contacts f4 become closed. For this brief interval the reverse relay coil R is energized through contacts s3 and f4, and it closes its contacts r1, r2 and r3 in the stator energization circuit of the motor to reverse the energization of the stator.

The abrupt phase reversal in the stator energization circuit causes the rotor output signal to change abruptly from the normal run frequency of 10 cycles per second, at point $F^2$ in FIG. 3, up to 110 cycles per second at point $H^1$ in FIG. 3. As the rotor output signal frequency increases abruptly in this manner, the relay coil Y will be energized enough to close its contacts y1 so as to maintain relay R energized after the time-delayed opening of the start relay contacts s3.

Such energization of relay Y takes place as follows:

As already stated, the tuned circuit 29–31 is resonant at about 120 cycles per second. Its impedance at any frequency above about 65 cycles per second is relatively low so that at point G' in FIG. 3, which may be 70 cycles per second, it presents a relatively low impedance. At the same time that the signal frequency is increasing abruptly, the rotor output voltage is increasing abruptly from the point F in FIG. 2 up to the point H. At 70 cycles per second or higher, the combined effect of the reduced impedance of the tuned circuit 29–31 and the increased rotor output voltage appearing across the rotor output terminals $A^2$, $B^2$ is such that the voltage on the adjustable contact 27 of potentiometer 28 will be high enough to turn on the SCR 20, thus substantially short-circuiting the transformer secondary 19. Consequently, the voltage drop across the transformer primary 17 will decrease abruptly, and most of the voltage drop between the rotor terminals $A^2$ and $B^2$ will now appear across the relay coil Y. The latter will be energized sufficiently to close its contacts y1 to maintain the reverse relay R energized. The current now flowing through the relay coil will produce a voltage drop across resistor 18, which is in series with both the relay coil and the potentiometer 28. Consequently, the voltage at the adjustable contact 27 of the potentiometer and at the control electrode 26 of SCR 20 will be reduced, but not enough to prevent the SCR from turning on during each positive half cycle of the rotor output signal voltage.

After the rotor output signal has reached its maximum frequency, here assumed to be 110 cycles per second, the reverse energization of the stator will tend to cause the rotor to turn in the reverse direction. Since the rotor and its load have considerable inertia which tends to keep it rotating in the forward direction, the mutually opposing forces of this inertia and the reverse energization of the stator will cause the rotor to slow down (still rotating in the forward direction) and will cause the rotor signal frequency to diminish along the line $J^1$ in FIG. 3 until it reaches a point $K^1$ at which relay Y will drop out (i.e., at which the energization of relay coil Y will be insufficient to hold its contacts y1 closed). In the case under discussion, the relay Y will drop out when the rotor output signal frequency has decreased to about 65 cycles per second. At this signal frequency, the rotor output voltage will have decreased to the point K in FIG. 2, and the impedance of the tuned circuit 29–31 at this signal frequency will be high enough that the voltage on the control electrode 26 of SCR 20 will be insufficient to turn on the SCR for current flow between its anode 21 and cathode 22 in the next positive half cycle of the rotor output signal voltage, keeping in mind that the voltage at the control electrode 26 of the SCR while the relay coil is conducting current is reduced by the voltage drop across resistor 18.

With the relay contacts y1 now open, relay R will be de-energized and the reverse energization of the stator 11 will be terminated. The rotor 12 of the motor will coast to a stop.

A particular advantage of the present invention is that the relay coil Y is not part of the tuned circuit 29–31 which determines the drop-out point of the reverse energization. This drop-out point is determined by the values of the inductance 29 and the capacitors 30, 31 and by the setting of the adjustable contact 27 on the potentiometer. There is no necessity to adjust the relay Y to provide the desired drop-out point, and therefore the relay Y may be of a rugged, non-adjustable construction so that its operation is not subject to change due to aging or the physical shocks to which it may be subjected when used, such as on a printing press, for example. In practice, the drop-out frequency of the relay, which is of critical importance in order to prevent the motor rotor from reverse rotation, may be set at just a few cycles per second below its pick-up frequency because the energization current for relay coil Y causes a voltage drop across resistor 18, thus reducing the voltage applied to the adjustable contact 27 of the potentiometer 28 and the control or gate electrode 26 of SCR 20, as described.

While a presently-preferred embodiment of the present control circuit, as applied to the control of a wound rotor A.C. motor, has been described in detail with reference to the accompanying drawing, it is to be unstood that various modifications, omissions and adaptations which depart from the disclosed embodiment, including uses of this control circuit other than for controlling the braking of a wound rotor A.C. motor by reverse energization of its stator, may be adopted without departing from the scope of this invention, as defined in the appended claims.

Having described our invention, we claim:

1. In a control circuit for an A.C. motor having a stator and a wound rotor, said control circuit comprising means for providing forward energization of the stator to produce forward rotation of the rotor, an output circuit connected to the rotor to receive an output signal voltage therefrom whose magnitude and frequency depend upon the energization of the stator and the rotational speed of the rotor, and means for initially reversing the energization of the stator to cause the rotor to slow down and to increase the magnitude and frequency of said output signal, the improvement which comprises:

a relay having a coil and contacts which control the continued reverse energization of the stator;

a transformer having a primary winding connected in series with the coil of said relay in said rotor output circuit, said transformer having a secondary winding inductively coupled to said primary winding;

a controlled rectifier having its anode-cathode path connected across said secondary winding and having a control electrode;

and a tuned circuit and potentiometer connected in series in said rotor output circuit, said potentiometer having an adjustable contact connected to said control electrode of the controlled rectifier;

said tuned circuit presenting a high impedance to the rotor output signal then the stator is energized to produce forward rotation of the rotor, so that the voltage on the control electrode of the controlled rectifier is insufficient to turn the latter on and the controlled rectifier presents substantially a high impedance load across the transformer secondary winding, causing substantially all of the voltage across the series-connected relay coil and the transformer primary winding to appear across the transformer primary winding so that the relay coil is insufficiently energized to close said contacts;

said tuned circuit, when the stator energization is initially reversed, presenting an impedance which decreases progressively as the rotor output signal frequency increases and, at a predetermined first frequency of said signal, producing a voltage on the control electrode of the controlled rectifier sufficiently high to turn the latter on, so as to substantially present a low impedance load across the transformer secondary winding and thereby reduce the voltage across the transformer primary winding, causing the voltage across the relay coil to increase to a value effective to close said contacts for maintaining the reverse energization of the stator;

said tuned circuit, as the reverse energization of the stator continues and the forward speed of the rotor decreases, presenting an impedance which increases progressively as the rotor output signal frequency decreases and, at a predetermined second frequency below said first frequency, reducing the voltage on said control electrode of the controlled rectifier to a value effective to turn the latter off, so as to present a high impedance load across the transformer secondary winding and thereby increase the voltage across the transformer primary winding and reduce the voltage across the relay coil to a value insufficient to hold said contacts closed.

2. A control circuit according to claim 1, and further comprising resistance means connected in series with both the relay coil and the potentiometer in said rotor output circuit to reduce the voltage at said adjustable contact of the potentiometer and at the control electrode of the controlled rectifier when the voltage across the relay reaches said value effective to close said contacts.

3. A control circuit according to claim 1, and further comprising capacitor means connected across the transformer secondary winding to limit the voltage thereacross.

4. A control circuit according to claim 1, and further comprising diode means connected across the control electrode and the cathode of said controlled rectifier to limit the voltage thereacross.

5. A control circuit for an A.C. motor having a stator and a wound rotor, said control circuit comprising:

means for connecting the stator for forward energization to cause forward rotation of the rotor;

means for developing an output signal from the rotor whose frequency depends upon the energization of the stator and the rotational speed of the rotor;

means for initially reversing the energization of the stator to cause the rotor to slow down;

a relay comprising a coil and contacts controlling the continued reverse energization of the stator;

frequency-sensitive means responsive to the rotor output signal frequency for controlling the operation of said relay to discontinue said reverse energization of the stator;

said relay being separate from said frequency-sensitive means so that the electrical impedance of said relay coil does not affect the frequency of the rotor output signal to which said frequency-sensitive means responds;

voltage-sensitive switching means coupled to said frequency-sensitive means and operable to control the energization of said relay;

and impedance means connected to said relay coil and coupled to said voltage-sensitive switching means to reduce the control voltage at the latter in response to increased current through the relay coil.

6. A control circuit for an A.C. motor having a stator and a wound rotor, said control circuit comprising:

means for connecting the stator for forward energization to cause forward rotation of the rotor;

means for developing an output signal from the rotor whose frequency depends upon the energization of the stator and the rotational speed of the rotor;

means for initially reversing the energization of the stator to cause the rotor to slow down;

a relay comprising a coil and contacts controlling the continued reverse energization of the stator;

a frequency-sensitive tuned L-C circuit responsive to the rotor output signal frequency for controlling the operation of said relay to discontinue said reverse energization of the stator;

said relay being separate from said frequency-sensitive means so that the electrical impedance of said relay coil does not affect the frequency of the rotor output signal to which said frequency-sensitive tuned circuit responds;

a potentiometer connected in series with said tuned circuit to said rotor output signal, said potentiometer having an adjustable contact;

and a controlled rectifier coupled to said relay to control the latter's energization in response to current conduction by the controlled rectifier, said controlled rectifier having a control electrode connected to said adjustable contact on the potentiometer to cause the controlled rectifier to turn on when the rotor output signal frequency increases after the initial reverse energization of the stator and to render the controlled rectifier non-conducting when the rotor output signal frequency drops to a predetermined value as the rotor slows down.

7. A control circuit according to claim 6, and further comprising resistance means connected in series with both said relay coil and said potentiometer to reduce the voltage at said adjustable contact on the potentiometer and at the control electrode of the controlled rectifier in response to increased current through the relay coil.

8. A control circuit according to claim 6, and further comprising a transformer coupling said controlled rectifier and said relay to each other.

9. For use in a control circuit for a wound rotor A.C. motor having means for providing forward energization of the motor stator to produce forward rotation of the motor rotor, and means for initially reversing the energization of the stator to cause the rotor to slow down, the improvement which comprises:

a relay having a coil for receiving an output signal from the rotor whose frequency depends upon the energization of the stator and the speed of the rotor, and contacts controlling the continued reverse energization of the rotor;

a frequency-sensitive L-C tuned circuit connected to sense said rotor output signal and to control the operation of said relay so as to cause the relay to complete a holding circuit for maintaining the reverse energization of the stator when the rotor output signal frequency increases in response to the initial reverse energization of the stator and to disconnect said holding circuit to discontinue the reverse energization of the stator when the rotor output signal frequency decreases to a predetermined value, said frequency-sensitive tuned circuit being separate from said relay;

a potentiometer connected in series with said tuned circuit, said potentiometer having an adjustable contact;

voltage sensitive switching means controlling the operation of said relay and connected to said adjustable contact to operate in response to the voltage thereat;

and resistance means connected in series with both said relay coil and said potentiometer to reduce the voltage at said adjustable contact on the potentiometer in response to increased current through the relay coil.

10. For use in a control circuit for a wound rotor A.C. motor having means for providing forward energization of the motor stator to produce forward rotation of the motor rotor, and means for initially reversing the energization of the stator to cause the rotor to slow down, the improvement which comprises:

a relay having a coil for receiving an output signal from the rotor whose frequency depends upon the energization of the stator and the speed of the rotor, and contacts controlling the continued reverse energization of the rotor;

a frequency-sensitive L-C tuned circuit connected to sense said rotor output signal and to control the operation of said relay so as to cause the relay to complete a holding circuit for maintaining the reverse energization of the stator when the rotor output signal frequency increases in response to the initial reverse energization of the stator and to disconnect said holding circuit to discontinue the reverse energization of the stator when the rotor output signal frequency decreases to a predetermined value, said frequency-sensitive tuned circuit being separate from said relay;

a potentiometer connected in series with said tuned circuit to the rotor output signal, said potentiometer having an adjustable contact;

and a controlled rectifier coupled to said relay to enable the latter to be energized when said rectifier conducts and to render the latter substantially de-energized when said rectifier is non-conducting, said controlled rectifier having a control electrode connected to said adjustable contact on the potentiometer to turn on said rectifier for energization of the relay to complete said holding circuit when the rotor output signal frequency increases after the initial reverse energization of the stator and to render said rectifier non-conducting for de-energization of the relay to open said holding circuit when the rotor output signal frequency drops to a predetermined value as the rotor slows down due to the continued reverse energization of the stator;

and resistance means connected in series with both said relay coil and said potentiometer to reduce the voltage at said adjustable contact and at the control electrode of the controlled rectifier in response to an increase of current through the relay coil.

References Cited

UNITED STATES PATENTS

| | | | |
|---|---|---|---|
| 1,983,656 | 12/1934 | Brown | 318—210 XR |
| 2,467,582 | 4/1949 | Corkran | 318—210 XR |
| 2,872,633 | 2/1959 | Schurr | 318—210 XR |

BENJAMIN DOBECK, Primary Examiner

GENE RUBINSON, Asssitant Examiner

U.S. Cl. X.R.

318—210

PO-1050
(5/69)

UNITED STATES PATENT OFFICE
CERTIFICATE OF CORRECTION

Patent No. 3,496,440      Dated February 17, 1970

Inventor(s) William H. Lee and Roger H. Stotzer

It is certified that error appears in the above-identified patent and that said Letters Patent are hereby corrected as shown below:

In the claims: Column 7, line 24, the word "then" should read -- when --

SIGNED AND
SEALED
JUL 14 1970

(SEAL)
Attest:

Edward M. Fletcher, Jr.
Attesting Officer

WILLIAM E. SCHUYLER, JR.
Commissioner of Patents